United States Patent [19]

Flanagan

[11] Patent Number: 4,623,688
[45] Date of Patent: Nov. 18, 1986

[54] REMOISTENABLE HOT MELT ADHESIVES

[75] Inventor: Thomas P. Flanagan, Green Brook, N.J.

[73] Assignee: National Starch and Chemical Corporation, Bridgewater, N.J.

[21] Appl. No.: 808,596

[22] Filed: Dec. 12, 1985

Related U.S. Application Data

[63] Continuation-in-part of Ser. No. 759,397, Jul. 26, 1985, abandoned.

[51] Int. Cl.$^4$ .................. C08K 5/06; C08L 71/00
[52] U.S. Cl. .................. 524/377; 156/331.5; 524/502; 524/612
[58] Field of Search .......... 524/377, 612, 502; 156/331.5

[56] References Cited

U.S. PATENT DOCUMENTS

| 3,345,320 | 10/1967 | Uffner et al. | 524/312 |
|---|---|---|---|
| 3,462,342 | 8/1969 | Cooper et al. | 524/517 |
| 3,483,141 | 12/1969 | Litt et al. | 528/402 |
| 3,888,811 | 6/1975 | Sirota et al. | 524/310 |
| 4,408,001 | 10/1983 | Ginter et al. | 524/376 |
| 4,436,789 | 3/1984 | Davis et al. | 524/612 |
| 4,436,867 | 3/1984 | Pomplun et al. | 524/502 |
| 4,474,928 | 10/1984 | Hoenig et al. | 525/186 |
| 4,481,167 | 11/1984 | Ginter et al. | 422/29 |
| 4,485,220 | 11/1984 | Hefner et al. | 525/411 |
| 4,486,246 | 12/1984 | Warchol | 148/18 |
| 4,522,967 | 6/1985 | Sheldon et al. | 524/377 |
| 4,548,845 | 10/1985 | Parsons et al. | 524/377 |

OTHER PUBLICATIONS

Dow Chemical U.S.A. Technical Information: Typical Properties of Poly(Ethyloxazoline) 25 pp.
Dow Chemical U.S.A. Technical Information: Developmental Polymer XAS-19874 Poly(Ethyloxazoline) Sep. 5, 1984.

Primary Examiner—Ronald W. Griffin
Attorney, Agent, or Firm—Ellen T. Dec; Edwin M. Szala

[57] ABSTRACT

Remoistenable hot melt adhesives are prepared from a poly(alkyloxazoline), a diluent and, optionally, a tackifier, plasticizer, stabilizer and non-block additive.

10 Claims, No Drawings

REMOISTENABLE HOT MELT ADHESIVES

This is a continuation-in-part of U.S. patent application Ser. No. 759,397 filed July 26, 1985, now abandoned.

BACKGROUND OF THE INVENTION

The present invention is directed to remoistenable hot melt adhesives. In particular, the invention is directed to remoistenable hot melt adhesives characterized by an outstanding balance of non-block characteristics under heat and high humidity conditions combined with excellent bond strength.

Hot melt adhesives achieve a solid state and resultant cohesive strength by cooling, as opposed to other types of adhesives which achieve the solid state through evaporation or removal of solvents, or by polymerization. At room temperature, a hot melt applicable adhesive is a thermoplastic, non-volatile solid material. When the hot melt adhesive is heated, it liquifies; after removal of heat, it solidifies on cooling. Hot melt adhesives are usually used for reasons such as process speed, streamlining of process equipment by elimination of driers and other auxiliary equipment or the like. To be water-moistenable, an adhesive composition must be activatable by moistening with water.

A water-moistenable hot melt applicable adhesive composition is a bonding agent which may be applied to one surface utilizing a hot melt technique and another surface using a water-moistening technique, so that the two surfaces are bonded together by means of the composition. By way of example, such a composition may be applied by the hot melt technique as gumming for labels, sealing tapes and envelope flaps at a point of manufacture where the intricate equipment required for hot melt application is available, the labels, sealing tape and envelope flaps, ultimately being applied by the consumer to other surfaces using the much simpler water-moistening technique, e.g., by moistening the adhesive coating prior to application to the other surface. The hot melt application is utilized where the required equipment is available because it is a rapid and economical technique; the water-moistening technique is utilized precisely because it doesn't require such elaborate equipment.

In attempting to provide a single adhesive composition which is to be applied to one surface using a hot melt technique and another surface using a water-moistening technique, considerations arise which are not present in the provision of an adhesive composition to be applied by either technique alone. For example, most water-moistenable adhesives do not possess the requisite thermoplastic properties permitting hot melt application of desirably smooth glossy coats thereof. Similarly, most hot melt applicable thermoplastic adhesives are water insensitive and cannot be readily tackified by water-moistening. Moreover, such adhesive compositions must obviously be heat-tackifiable to be applied by hot-melt techniques and also moisture-tackifiable to form bonds by water-moistening techniques. On the other hand, once the composition has been hot-melt applied to a substrate, it must be able to resist elevated temperature conditions likely to be found in its environment without again becoming tackifiable or undergoing other undesirable changes, such as discoloration (darkening), over a prolonged period of time. Similarly, it must be able to withstand the various humid conditions likely to be found in its environment without becoming tacky until it is actually moistened immediately prior to use. Consider, for example, the common phenomenon of postal envelopes with water-moistenable gumming on the flaps which become prematurely sealed on humid summer days. The same problem occurs on a larger scale within the adhesive manufacturing plant when an adhesively coated substrate carrying the hot-melt applied composition is formed into a layered roll or sheet-on-sheet storage configuration and the adhesive of one layer or sheet starts to adhere to the substrate of the layer or sheet underneath. The tendency of the adhesive to undergo premature sealing under humid conditions is measured in terms of the humidity blocking resistance at a given relative humidity (under a given load at a given temperature, for a given period of time). The blocking resistance is normally measured in terms of the percentage tear occurring, with high levels of blocking producing high levels of tear when the adhesive-bearing substrate is removed from the opposed surface.

SUMMARY OF THE INVENTION

I have now found that when hot melt remoistenable adhesives are formulated using a poly(alkyloxazoline) polymer together with conventional diluents and tackifiers, the resultant adhesive will form dry non-blocking films having superior heat and humidity resistance which films can be remoistened with water to give strong "papertearing" bonds. Thus, the present invention is directed to remoistenable non-volatile hot melt adhesive compositions comprising:

(a) 25 to 60% by weight poly(alkyloxazoline);
(b) 20 to 75% by weight diluent;
(c) 0 to 40% by weight tackifier;
(d) 0 to 25% by weight plasticizer;
(e) 0 to 4% by weight stabilizer, and
(f) 0 to 5% by weight non-block additives;

with the total of components c through f comprising a maximum of 40% by weight of the composition.

DETAILED DESCRIPTION OF THE PREFERRED EMBODIMENTS

While any of the poly(alkyloxazoline) compounds disclosed in U.S. Pat. No. 4,474,928 may be used herein, the most readily available is polyethyloxazoline, a compound consisting primarily of repeating units (I) which is prepared by the ring-opening polymerization of 2-ethyl-2-oxazoline (II).

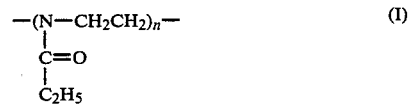

The ring-opening polymerization of 2-ethyl-2-oxazoline is generally conducted in the presence of a cationic polymerization catalyst at a reaction temperature of about 0° C.–200° C. Typical catalysts include strong mineral acids, organic sulfonic acids and their esters, acidic salts such as ammonium sulfate, Lewis acids such as aluminum trichloride, stannous tetrachloride, boron trifluouride and organic diazomlumfluoroborates, dialkyl sulfates and other like catalysts. This ring-opening polymerization is further described by Tomalla et al. J. Polymer Science, 4,2253 (1966); Bassiri et al. Polymer Letters, 5,871 (1967); Seeliger, Ger. 1,205,585; Jones and Roth, U.S. Pat. No. 3,640,909; and Litt et al., U.S. Pat. No. 3,483,141. The pre-hydrolyzed polymers thereby obtained are linear, N-acylated polyethylamines having a molecular structure essentially of repeating units (I). These polymers can be used as such or be partially hydrolyzed (deacylated) by contact with a strong acid, such as HCl, followed by contact with a base, such as NaOH. Alternatively, this polymer is available from Dow Chemical Corp. under the name PEOx.

Typically, the poly(alkyloxazoline) has a molecular weight within the range of 1,000 to 1,000,000. In the present invention, it is preferable to use poly(ethyloxazoline) having a molecular weight within the range of about 50,000 to about 500,000. The poly(alkyloxazoline) is used in the adhesive in an amount of 25 to 60%, preferably 40 to 50% by weight.

The diluents useful herein as viscosity modifying materials, incude those polymers, copolymers and resins typically used in remoistenable hot-melts, including, but not limited to, glycerol mono- and distearate; synthetic long chain linear polymeric alcohols such as Bareco's Polywax OH550 and 425; high acid number waxlike materials of mono - or dicarboxylic acid; acid wax derived from montan wax, i.e., Hoechst Wax-S; stearic acid and stearyl alcohol; hydrogenated castor oil; polyethylene glycols such as Carbowax available from Union Carbide; 12(OH) stearic acid; stearic-cetyl alcohols blends.

The plasticizer or "fluxing" agent which may be present to lower the melt temperature (softening point) of the composition may be selected from those used in conventional hot melt remoistenable adhesives. These are generally monomeric or very low molecular weight polymers and contain no solvents or water and include, but are not limited to, benzoates, glycollates, phthalates, sulfonamides or the like. Among the preferred plasticizers are triacetin and polyols, e.g., glycerol sorbitol and polyethylene glycols. Specific plasticizers useful herein are triethylene glycol; N-ethyl p-toluene sulfonamide available as Santicizer 8 from Monsanto; Resoflex 296, a polyester plasticizer from Cambridge Chemicals; Benzoflex 50, a benzoic acid ester from Velsicol; Pycal 94, a phenyl ether of polyethylene glycol from ICI America; triethyl citrate and sucrose acetate isobutyrate; glycerine, and castor oil. If used, these plasticizers are generally present in amounts of 5 to 25%.

It may also be desirable to incorporate herein a tackifying resin which serves to extend the adhesive properties of the system. Suitable tackifiers are (1) natural and modified rosins such, for example, as gum rosin, wood rosin, tall-oil rosin, distilled rosin, hydrogenated rosin, dimerized rosin, and polymerized rosin, (2) polyterpene resins having a softening point, as determined by ASTM method E28 58T, of from about 60° to 140° C. the latter polyterpene resins generally resulting from the polymerization of terpene hydrocarbons, such as bicyclic mono-terpene known as pinene in the presence of Friedel-Crafts catalysts at moderately low temperatures. (3) phenolic-modified terpene resins such, for example, as the resin product resulting from the condensation in an acidic medium, of a bicyclic terpene and a phenol; (4) alphatic petroleum hydrocarbon resins having a Ball and Ring softening point of from about 60° to 140° C., the latter resins resulting from the polymerization of monomers consisting primarily of olefins and diolefins, (5) glycerol and pentaerythritol; (6) esters of rosin or modified rosin; (7) styrene resins and modified styrene resins; (8) hydroabietyl alcohol and the phthalate ester thereof; and (9) aliphatic, aromatic and aliphatic/aromatic copolymers and their hydrogenated counterparts. Especially preferred are rosin derived resins. These tackifying resins, if used, are present in an amount of about 5 to 40% by weight of the adhesive.

Antioxidants or stabilizers which aay be employed in remoistenable hot melt compositions disclosed by this invention include phenolics, amines, and quinones or the like. Especially useful herein are the high molecular weight hindered phenols and multifunctional phenols such as sulfur and phosphorous-containing phenols. Hindered phenols are well known to those skilled in the art and may be characterized as phenolic compounds which also contain bulky radicals in close proximity to the phenolic hydroxyl group thereof. In particular, tertiary butyl groups generally are substituted onto the benzene ring in at least one of the ortho positions relative to the phenolic hydroxy group. The presence of these substituted radicals in the vicinity of the hydroxyl group serves to retard its stretching frequency and correspondingly, its reactivity. This steric hindrance thus provides the phenolic compound with its stabilizing properties. Representative hindered phenols include: 1,3,5-trimethyl-2,4,6-tris(3,5-di-tert-butyl-4-hydroxybenzylbenzene; pentaerythritol tetrakis-3(3,5-di-tert-butyl-4-hydroxyphenyl)-propionate, n-octadecyl-3(3,5-di-tert-butyl-4-hydroxyphenyl)propionate, 4,4'-methylenebis(2,6-di-tert-butylphenol); 2,2'-methylenebis(4-methyl-6-tert-butylphenol); 4,4'-thiobis(6-tert-butylo-cresol); 2,6-di-tert-butylphenol; 6-(4-hydroxyphenoxy)-2,4-bis(n-octylthio)-1,3,5-triazine; 2,4,6-tris(4-hydroxy-3,5-di-tert-butylphenoxy)-1,3,5-triazine; di-n-octadecyl-3,5-di-tert-butyl-4-hydroxybenzylphosphonate; 2-(n-octylthio)ethyl)3,5-di-tert-butyl-4-hydroxybenzoate, and sorbitol hexa-[3-(5-di-tert-butyl-4-hydroxy-phenyl)propionate]. The antioxidant is generally used at levels of 0.2 to 2% by weight.

The performance of these antioxidants may be further enhanced by utilizing, in conjunction therewith (1) synergists such, for example, as thiodipropionate esters and phosphites; and (2) chelating agents and metal deactivators such, for example, as ethylenediamine tetraacetic acid.

Non-block additives such as the petroleum and synthetic waxes and the fatty amines may also be present. Typical of these are Acrawax C, a 140°-143° C. melt point synthetic wax from Glyco Chemicals; erucyl amide; oleyl amide; N,N' ethylenebisoleamide and the like. The non-block additives, if used, are present in amounts of about 0.16 to 5%.

Optional additives may be incorporated in minor amounts, generally 5% by weight, or less, into the hot melt compositions in order to modify certain properties thereof. Among these additives may be scenting and flavoring agents, perfumes, preservative agents, wetting agents, colors and dyes, inert fillers, extenders, and the like.

These hot melt adhesive compositions may be formulated using techniques known in the art. An exemplary procedure involves placing approximately all of the total diluent, the poly(alkyloxazoline), stabilizer and any optional additives whose presence may be desired in a jacketed mixing kettle, or in a jacketed heavy duty mixer of the Baker-Perkins or Day type, which is equipped with rotors and thereupon raising the temperature to a range of from about 250° to 350° F. Mixing and heating are continued until a smooth, homogeneous mass is obtained whereupon the tackifying resin(s), if any, are thoroughly and uniformly admixed therewith.

Remoistenable hot melt adhesives prepared by the above methods may be applied (coated) to any substrate by known industrial methods. An important requirement for the application of hot melt adhesives is that all machine parts (including resevoir, application and metering rollers or blades) should be heated to prevent the premature cooling or setting of the adhesive. Thus, conventional coating methods known in the art as direct roll coaters, reverse roll coaters, stencil or pattern transfer coaters, coaters utilizing printing techniques such as rotogravure or flexographic, knife or blade coaters, and extruders may be used for the application of hot melts provided that the aforesaid machine parts are adapted to provide uniform heating of the hot melt while in the reservoir and during its application.

This invention can be further illustrated by following examples or preferred embodiments thereof, although it will be understood that these examples are included merely for purposes of illustration and are not intended to limit the scope of the invention unless otherwise specifically indicated. In these examples all parts are given by weight.

EXAMPLES

The following examples show representative formulations falling within the scope of the patent. Also noted in Table I are the test results for each of the sample formulations.

In the examples, the adhesives prepared were then subjected to the tests described below:

Viscosity is measured in cps at 300° F. (the average hot application temperature) using a Brookfield Thermosel.

The test samples were prepared by coating the hot melt using a pair of metal rollers heated at 200° F. and set at a gap of 8 thousandths between rollers onto 4 thousandths inch thick bond paper. The paper strip was placed between the rollers the hot melt poured onto the rollers at approximately 325° F. and the paper pulled through the gap. The approximate coating thickness for each sample was 1 thousandth of an inch. All samples were stored and tested in a humidity controlled environment.

120° F. Heat Pressure Blocking Test: The bond paper coatings were placed face to back under a pressure of ½ pound per square inch at 120° F. for periods extending from overnight to 24 hours. They were removed, cooled and separated with the degree of difficulty noted and expressed in terms of zip and pick as described below.

Humidity Blocking Test: The adhesive is applied in molten form to a white wove envelope stock substrate (½ inch × 1 inch), and a glass plate is used to press the gummed surface of the substrate down upon a blank sheet of paper supported by a temperature- and humidity-conditioned urethane foam. The test block is evaluated after 24 hours at the specified level of relative humidity (75 percent, or 83 percent) and 22° C. temperature, and the amounts of zip, pick and percent tear are recorded. "Non-block" indicates completely free release of the gummed surface from the blank sheet.

"Zip" indicates a superficial attraction while usually accompanied by a zipping noise during release of the surfaces, and is not as serious as "pick". Pick indicates small, isolated, pin point areas of tear, usually totaling less than 5 percent of the total surface area.

140° F. Westvaco White Wove Blocking Test: This method is more stringent than the 120° F. blocking test. In this case, a 1 mil coating of the hot melt is applied to a 4 × 10 inch Westvaco envelope stock. Then 2 × 2 inch squares of the coated stock were placed face to back of blank stock for each sample, with three blanks used on top and bottom for cushioning. The samples were placed in a 140° F. oven overnight with a 1 × 1 inch 125 grams stainless steel cube placed in the middle of each square. They were removed from the oven, equilibrated to room temperature and tested as above.

Remoistening percent tear is measured using coated substrates of the type described in connection with the humidity blocking test hereinabove the coatings being moistened in a single stroke with a brush wet with water and pressed down on a large sheet of similar white wove envelope stock. The moistened coating is allowed to dry for one hour and then a measurement made of the percentage of the total coated surface torn.

EXAMPLE 1

Two remoistenable hot melt adhesive compositions were prepared by mixing the component listed in Table 1 with low shear in a stainless steel vessel at a temperature of 150° C. until a homogeneous mass was obtained. Adhesive 1 was coated and tested on bond stock while Adhesive 2 was coated on white wove stock. The results are shown in the table.

TABLE 1

| ADHESIVE | 1 | 2 |
| --- | --- | --- |
| PeOX .05 (1) | 40 | — |
| PeOX .03 (2) | — | 40 |
| Stearyl alcohol | 40 | — |
| 12 (OH) stearic acid | — | 30 |
| Piccotex 75 (3) | 20 | — |
| Foral NC (4) | — | 20 |
| Bareco Polywax 550 | — | 10 |
| Irganox 1010 (5) | 0.1 | 0.1 |
| Viscosity | 3375 | 4065 |
| Humidity Blocking | | |
| 75% RH | non block | slight zip |
| 83% RH | very slight zip | slight zip |
| 140° Block | very tight zip | zips off |
| Remoistening % Tear | 100% | 100% |

(1) Molecular weight 500,000
(2) Molecular weight 200,000
(3) A modified styrene resin from Hercules Chemical
(4) A modified rosin from Hercules Chemical
(5) A pentaerythritol tetrakis-3-(3,5-ditert-butyl-4-hydroxyphenol) propionate stabilizer.

EXAMPLE 2

Another series of adhesives were prepared in a manner similar to that described in Example 1 but using the components shown in Table 2. These adhesives were tested for humidity blocking with Adhesive 3 tested on bond and Adhesive 4 on white wove. Both were then tested using the 120° F. Blocking test.

TABLE 2

| ADHESIVE | 3 | 4 |
| --- | --- | --- |
| PeOX .05 | 45 | — |
| PeOX .03 | — | 60 |
| Stearyl Alcohol | 45 | 40 |
| Rosin Ester | 10 | — |

TABLE 2-continued

| ADHESIVE | 3 | 4 |
|---|---|---|
| Bareco Polywax 425 | — | 10 |
| Irganox 1010 | 0.1 | 0.1 |
| Viscosity (300° F.) | 2940 | 3750 |
| Humidity Blocking | | |
| 75% RH | slight zip | v. slight zip |
| 83% RH | slight zip | v. slight zip |
| 120° Block | slight zip | slight zip |
| % Remoistening Tear | 100% | 100% |

EXAMPLE 3

Further adhesives were prepared and tested using the procedures of Example 1. The components and results are shown in Table 3.

TABLE 3

| ADHESIVE | 5 | 6 |
|---|---|---|
| PeOX .03 | 40 | 45 |
| Hydrogenated Castor Oil | 35 | — |
| 12 (OH) Stearic Acid | — | 15 |
| Foral NC | 20 | — |
| Carbowax 6000 | 5 | 5 |
| Castor Wax | — | 36 |
| Irganox 1010 | .1 | .1 |
| Viscosity | 13,250 | 5065 |
| Humidity Blocking | | |
| 75% RH | non-block | non-block |
| 83% RH | slight zip | non-block |
| 140° Block | zip | zip |
| % Remoistening Tear | 100% | 50–80% |

EXAMPLE 4

Another series of adhesives were prepared and tested as in Example. 1. When the adhesives of this series were tested using the 140° block test, some samples exhibited bleeding or wicking into the paper.

TABLE 4

| ADHESIVE | 7 | 8 | 9 | 10 | 11 |
|---|---|---|---|---|---|
| PeOX .03 | — | 40 | 40 | — | 40 |
| PeOX .05 | 40 | — | — | 40 | — |
| Stearyl alcohol | 30 | 40 | 40 | — | — |
| 12 (OH) Stearic acid | — | — | — | 20 | — |
| Foral NC | — | — | — | 20 | 25 |
| Bareco Polywax 425 | — | 20 | — | — | — |
| Rosin Ester | 30 | — | — | — | — |
| Hydrogenated Castor oil | — | — | — | 15 | — |
| Triethylene glycol | — | — | 10 | — | — |
| Acrawax C (1) | — | — | — | 5 | — |
| Irganox 1010 | .1 | .1 | .1 | .1 | 0.2 |
| Wax S (Hoechst) | — | — | — | — | 25.0 |
| Pycal 94 | — | — | — | — | 10.0 |
| Viscosity at 300° F. | 2750 | 2125 | 3750 | 4220 | 4815 |
| Humidity Blocking | | | | | |
| 75% RH | zip | non-block | zip | slight zip | zip |
| 83% RH | zip | non-block | zip | slight zip | slight pick |
| 140° Blocking | slight zip | tight pick | slight zip | slight tear | zip |
| Bleeding | moderate | none | heavy | none | none |
| % Remoistening | 100% | poor- | v. | 70% | 100% |
| Tear | | fair | good | | |

(1) A 140–143° C. melt point synthetic wax from Glycol Chemicals.

Now that thew preferred embodiments of the present invention have been described in detail, various modifications and improvements thereon will become readily apparent to those skilled in art. Accordingly, the spirit and scope of the present invention is to be limited only by the appended claims, and not by the foregoing disclosure.

I claim:

1. A remoistenable non-volatile hot melt adhesive composition comprising a blend of:
    (a) 25 to 60% by weight of a poly(alkyloxazoline);
    (b) 20 to 75% by weight diluent;
    (c) 0 to 40% by weight tackifier;
    (d) 0 to 25% by weight plasticizer;
    (e) 0 to 4% by weight stabilizer; and
    (f) 0 to 5% by weight non-block additives;
   where the total of components c through f comprises a maximum of 40% by weight of the total composition.

2. The remoistenable adhesive of claim 1 wherein the poly(alkyloxazoline) is poly(2-ethyloxazoline).

3. The remoistenable adhesive of claim 2 wherein the poly(2-ethyloxazoline) has a molecular weight of about 50,000 to 500,000.

4. The remoistenable adhesive of claim 1 wherein the poly(alkyloxazoline) is present in an amount of 40 to 50% by weight of the composition.

5. The remoistenable adhesive of claim 1 wherein the diluent is selected from the group consisting of glycerol mono- and distearate, synthetic long chain linear polymeric alcohols, stearic acid, high acid number waxlike materials of mono- or dicarboxylic acids, acid wax derived from montan wax, stearyl alcohol, hydrogenated castor oil, polyethylene glycol, 12 (OH) stearic acid and stearic-cetyl alcohol.

6. The remoistenable adhesive of claim 1 wherein the plasticizer is selected from the group consisting of benzoates, glycollates, phthalates and sulfonamides.

7. The remoistenable adhesive of claim 1 wherein the plasticizer is selected from the group consisting of triethylene glycol, N-ethyl p-toluene sulfonamide, triethyl citrate isobutyrate, sucrose acetate isobutyrate, phenyl ether of polyethylene glycol, glycerine and castor oil.

8. The remoistenable adheive of claim 1 wherein the plasticizer is present in an amount of 5 to 25% by weight of the composition.

9. The remoistenable adhesive of claim 1 wherein the tackifier is selected from the group consisting of polyterpene resins having a softening point, as determined by ASTM method E28 58T, of from about 60° to 140° C.; phenolic-modified terpene resins, alphatic petroleum hydrocarbon resins having a Ball and Ring softening point of from about 60° to 140° C.; glycerol and pentaerythitol; esters of rosin or modified rosin, styrene resins and modified styrene resins; hydroabietyl alcohol and the phthalate ester thereof; and aliphatic, aromatic and aliphatic/aromatic copolymers and their hydrogenated counterparts.

10. The remoistenable adhesive of claim 9 wherein the tackifying resin is derived from rosin.

* * * * *